United States Patent [19]
Subrahmanyam

[11] Patent Number: 5,987,254
[45] Date of Patent: Nov. 16, 1999

[54] SYSTEM-WIDE MEMOIZATION OF ARRAY DEPENDENCE INFORMATION

[75] Inventor: Pratap Subrahmanyam, Sunnyvale, Calif.

[73] Assignee: Hewlett Packard Company, Palo Alto, Calif.

[21] Appl. No.: 08/892,084

[22] Filed: Jul. 14, 1997

[51] Int. Cl.⁶ ................................................. G06F 9/445
[52] U.S. Cl. ............................................................ 395/705
[58] Field of Search ................................... 395/700, 706, 395/708, 709, 403, 705

[56] References Cited

U.S. PATENT DOCUMENTS

| | | | |
|---|---|---|---|
| 5,274,812 | 12/1993 | Inoue | 395/706 |
| 5,574,875 | 11/1996 | Stansfield et al. | 395/403 |
| 5,761,515 | 6/1998 | Barton et al. | 395/709 |

OTHER PUBLICATIONS

"Practical Dependence Testing" Goff/Kennedy/Tseng, Dept. of Computer Science, Rice University, Houston, TX, 1991 (Proceedings of the ACM SIGPLAN '91 Conference).

"Efficient and Exact Data Dependence Analysis" Maydan/Hennessy/Lam, Computer Systems Laboratory, Stanford University, CA, 1991, (Proceedings of the ACM SIGPLAN '91 Conference).

A practical algorithm for exact array dependence analysis, by Pugh, Communications of the ACM, Aug. 1992.

Experiences with Constraint–based Array Dependence Analysis by Pugh et al, UMIACS–TR, Nov. 1994.

Nonlinear Array Dependence Analysis, by Pugh et al, UMIACS–TR, Nov. 1994.

Efficient and Exact Data Dependence Analysis, Maydan et al, Stanford University.

Supporting Array Dependence Testing for an Optimizing/Parallerizing C Compiler, Justiani et al., McGill University.

*Primary Examiner*—Tariq R. Hafiz
*Assistant Examiner*—Chameli C. Das

[57] ABSTRACT

Data dependence information is stored in a global or system-wide cache so as to reduce the necessity for repeated analysis of similar array reference pairs in a compiler. The data dependence cache is not limited to compilation of a single file. Rather, it can be accessed and shared by multiple users and over compilation of various files. This scheme is advantageous because of the similarity of array references among many programs. The data dependence cache is maintained and updated by determining a relative value of each record in the cache in a manner reminiscent of LRU techniques familiar to artisans in the hardware memory cache domain. The data dependence cache can be made available to multiple instances of a compiler using file locking techniques, or it can be managed by a separate dependence analysis process that responds to messages from other processes requesting data dependence information. In view of the high cost of data dependence analysis, the invention provides substantial improvements in compiler performance.

21 Claims, 2 Drawing Sheets

SYSTEM-WIDE MEMOIZATION OF ARRAY DEPENDENCE INFORMATION

FIELD OF THE INVENTION

The present invention pertains to digital computer compiler technology and more specifically pertains to storing and retrieving data dependence analysis information so as to improve compiler efficiency.

BACKGROUND

"Dependence analysis" is a term used in compiler technology to determine whether or not two array references in a loop of code may access the same memory location during execution. More formally, we say that a data dependence exists between two statements $S_1$ and $S_2$ if there is a path from $S_1$ to $S_2$ and both statements access the same location in memory.

Along with basic information on depdendence, most dependence analyzers also provide and indication of how many iterations of the loop can occur before the dependence occurs. This "distance vector" information is further explained later. As a simple example, consider:

```
for (i = 0; i < 10; i++)
{
    A[i + 3] = A[i + 1] + 3;
}
```

In this case, regular alias analysis will not be able to determine whether A[i+3] and A [i+1] will certainly access the same memory location or not. It will only be able to tell that these two memory accesses may access the same location. However, dependence analysis technlology will precisely pinpoint the fact that the load will access the same location that was stored two iterations ago in the loop.

In the past decade, high performance computing has become increasingly important for may applications. Much progress has been made in developing large-scale parallel architectures composed of powerful commodity microprocessors. However, to effectively exploit parallelism and the memory hierarchy of these machines, compilers must be able to analyze data dependences precisely for array references in loop nests.

Calculating data dependence for arrays is complicated by the fact that two array references may not always access the same memory location. Dependence testing is the method used to determine whether dependences exist between two subscripted references to the same array in a loop nest. To illustrate, suppose that we wish to test whether or not there exists a dependence from statement $S_1$ to $S_2$ in the following model loop nest:

```
        DO i₁ = L₁, U₁
            DO i₂ = L₂, U₂
                ...
                DO iₙ = Lₙ, Uₙ
    S₁          A(f₁(i₁, ..., iₙ), ..., fₘ(i₁, ..., iₙ)) = ...
    S₂          ... = A(g₁(i₁, ..., iₙ), ..., gₘ(i₁, ..., iₙ))
                ENDDO
                ...
            ENDDO
        ENDDO
```

Let $\alpha$ and $\beta$ be vectors of n integer indices within the ranges of the upper and lower bounds of the n loops in the example. There is a dependence from S1 to S2 if and only if there exists $\alpha$ and $\beta$ such that $\alpha$ is less than or equal to B and the following system of dependence equations is satisfied:

$$f_i(\alpha) = g_i(\beta) \; \forall i, \; 1 \le i \le m$$

Otherwise, the two references are independent. It is also known that dependences may be characterized by their access pattern between loop iterations using distance and direction vectors. Suppose that there exists a data dependence for $\alpha = (\alpha_1, \ldots, \alpha_n)$ and $\beta = (\beta_1, \ldots, \beta_n)$. Then the distance vector $D = (D_1, \ldots, D_n)$ is defined as $\beta - \alpha$. The direction vector $d = (d_1, \ldots, d_n)$ of the dependence is defined by the equation: $d_1$ equals . . .

<if $\alpha_1 < \beta_1$

=if $\alpha_1 = \beta_1$

>if $\alpha_1 > \beta_1$

The elements are always displayed in order left to right, from the outermost to the innermost loop in the nest. For example, consider the following loop nest:

```
        DO 10 i
            DO 10 j
                DO 10 k
    10              A(i + 1, j, k - 1) = A(i, j, k) + C
```

The distance and direction vectors for the dependence between the definition and use of array A are (1, 0, -1) and (<, =, >), respectively. Since several different values of $\alpha$ and $\beta$ may satisfy the dependence equations, a set of distance and direction vectors may be needed to completely describe the dependence. Distance vectors specify the actual distance in loop iterations between two accesses to the same memory location. They may be used to guide optimizations to exploit parallelism or the memory hierarchy.

Dependence testing thus has two goals. First, it tries to disprove dependence between pairs of subscripted references to the same array variable. If dependences may exist, it tries to characterize them in some manner, usually as a minimal complete set of distance and direction vectors. Dependence testing must also be conservative and assume the existence of any dependence it cannot disprove. Otherwise the validity of any optimizations based on dependence information is not guaranteed. Various techniques are known in the prior art for making dependence determinations, but they are computationally very expensive.

"Memoization" is not a misspelling—it is known in computer science as a technique for recording and remembering the results of previous computations, so that repeating the same computations can be avoided. A memoization technique has been suggested to save the results of data dependence tests in order to avoid calling the data dependence routines multiple times on the same input. See, Dror Maydan, et al., "Efficient and Exact Data Dependence Analysis" (Computer Systems Labs, Stanford University, published in the Proceedings of the ACMSIGPLAN 1991). However, known memoization is limited to a single compilation of a single file, and therefore has limited utility. The need remains to provide more efficient ways for compilers to handle dependence issues.

SUMMARY OF THE INVENTION

In view of the foregoing background discussion, it is a general object of the present invention to reduce the effective cost of array dependence analysis in connection with compilation of a computer program.

Another object of the invention is to reduce or eliminate the need for repeating dependence analysis with respect to similar array references that occur in separate procedures.

A further object is to reduce the need for repeating dependence analysis with respect to similar array references that occur in separate files within a system or network.

A still further object of the invention is to leverage the commonality among array references made within loops of various procedures and programs.

Yet another object is to collect data dependence information from multiple compilations so as to reduce the need for redundant dependence analyses.

Another object is to collect data dependence information from multiple users and share such information so as to reduce the need for redundant dependence analyses in a multi-user system or network.

Still a further object is to quickly provide data dependence results upon request of a compiler by maintaining the most commonly used dependence results in a system-wide data dependence cache.

Another object of the invention is to deploy such a system-wide data dependence cache in a client-server environment in which a compiler merely sends a request to the server to obtain dependence testing results.

Accordingly, one aspect of the invention is a method of operation that comprises, first, determining a dependence relationship of a first pair of array references so as to form a result. The specific dependence analysis can be done using one or more of the techniques mentioned in the background. Second, the present invention calls for generalizing the first pair of array references so as to define a type of array reference pair that includes the first pair. For example, if the first pair is $a_1I+b_1$, $a_2I+b_2$, we can generalize the reference pair to the symbolic form: aI+b. The dependence information resulting from the analysis is stored in a "global" or system-wide cache file in association with the defined type of array reference pair so as to allow later retrieving the results in response to a query directed to the defined type of array reference pair. The system-wide cache is available for interrogation by any compiler on the system; or, in a client-server environment, a separate data dependence procedure maintains the cache and responds to compiler requests.

In operation, a compiler first creates a static, single-assignment based symbolic expression for a pair of references. That symbolic expression is compared to the types of array reference pairs already stored in the global cache file. If there is a match or cache "hit" the process immediately reads and returns the (previously determined) data dependence information for that type of array reference pair. The dependence information stored in the cache can include ternary results—i.e. dependent, independent or indeterminate (can't tell). If the inquiry does not match any of the array reference pairs previously stored in the global cache file—a miss—the dependence must be computed and is added to the cache file. See FIG. 4.

According to another aspect of the invention, the global array dependence cache includes a plurality of cache records, each record including: a first element storing a pair of array references; a second element storing result information describing dependence of the pair of array references; and, a third element storing an access count of a number of times the corresponding record has been accessed. Preferably, each data record further includes a fourth element storing a computation cost of recomputing the dependence result information stored in the corresponding record. Further, each record can include another element storing a relative value of the record, the relative value being a predetermined function of the computation cost and frequency of access of the corresponding record. This "value" information is used in a strategy for maintaining the cache—overwriting cache records that are relatively less valuable when the space is needed. The global cache result information can include loop boundary information. Preferably, however, loop boundaries are used to filter the result data after an initial lookup in the cache.

Another aspect of the invention is a computer system that includes a compiler; an array dependence analysis system available so that any instance of the compiler can send a request to the analysis process to obtain dependence information about a pair of array references specified in the request; and, a system-wide array dependence cache generally as described above for retaining data dependence information previously requested by an instance of the compiler, so that data dependence information can be accumulated and shared among multiple instances of the compiler.

In the presently preferred embodiment, the system-wide array dependence cache includes, for each one of a plurality of selected pairs of array references, both data dependence information—e.g. distance vector and direction vector—as well as cache record utilization information for maintaining the cache. See FIG. 3 by way of illustration. Because of the commonality that exists among most array references—even across various procedures, files and users—the system-wide data dependence cache of the present invention will provide substantial improvements in compiler performance by reducing the effective cost of data dependence analysis system-wide.

The foregoing and other objects, features and advantages of the invention will become more readily apparent from the following detailed description of a preferred embodiment of the invention which proceeds with reference to the accompanying drawings.

DETAILED DESCRIPTION OF A PREFERRED EMBODIMENT

Figure 1:
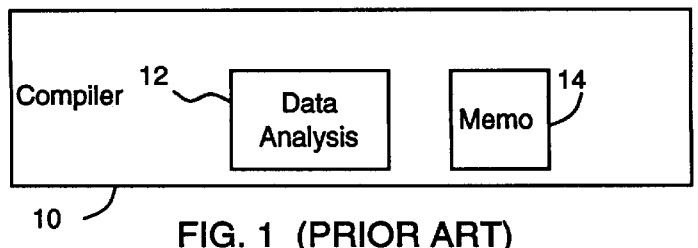
FIG. 1 is a simplified diagram of a known software environment in which a compiler has access to a data dependence analysis procedure.

FIG. 1 is a simplified diagram showing a compiler 10 that includes a data dependence analysis procedure 12. Various known analysis procedures are summarized in the Background section above. It is also known in the prior art for the compiler 10 to record data dependence information in a memo 14 (temporary memory location) in case the same type of analysis is required again during the same compilation. However, once the current compilation is completed, that information is lost. In other words, in the prior art, dependence memoization is limited to a single compilation of a single file.

Figure 2:
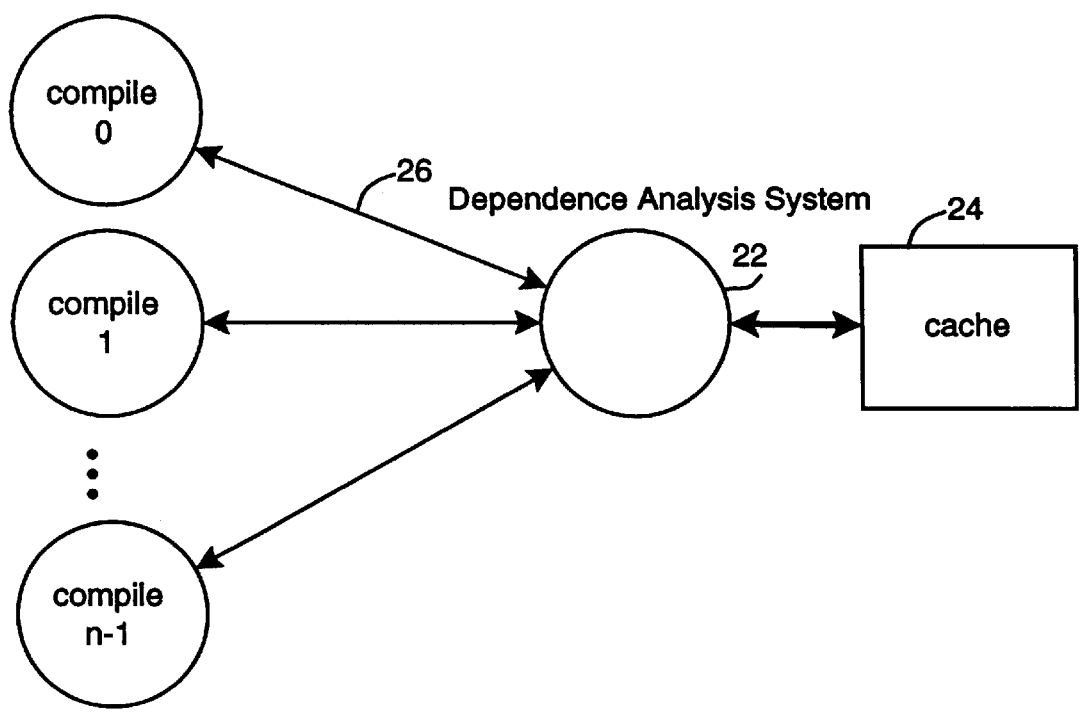
FIG. 2 is a simplified data flow diagram illustrating a system according to the present invention in which a data dependence analysis (program, engine, procedure) manages a system-wide data dependence cache for storing and retrieving data dependence information.

FIG. 2 is a simplified data flow diagram of a computer system 20 according to the present invention. In a system of this type, a data dependence analysis engine 22 is deployed, for example, in a client-server architecture, so that it is available to multiple users or multiple instances of a compiler, in the context of a multi-user system or network. The analysis engine 22 has access to and maintains a global or system-wide cache 24 for storing data dependence analysis results and related information as further described below. In operation, a compiler, e.g., compile 0, communicates with the analysis engine 22 via messaging 26 when dependence analysis is required. The compiler sends a message requesting dependence analysis, and including a pair of array references, as described above, in the request. The dependence analysis engine 22 provides the requested dependence information, taking advantage of the system-wide cache as explained later, and returns the results to the requesting compiler. Other instances of the compiler, "compile 1 . . . compile n-1", similarly send messages requesting dependence information as needed. Because neither currency nor coherency of the cache are critical, the analysis engine can maintain it using straightforward techniques for querying and updating the cache.

Figure 3:
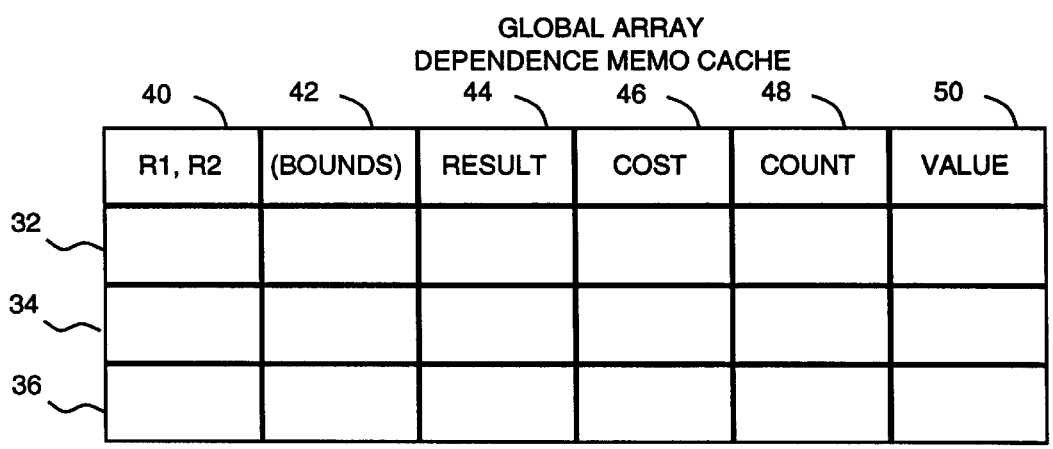
FIG. 3 is an illustration of a system-wide data dependence cache data structure useful in connection with a system of the type illustrated in FIG. 2.

FIG. 3 is a diagram illustrating the data structure for the global cache 24. The data can be stored in any memory accessible to the data analysis procedure, for example system RAM. However, since one of the advantages of the invention is based on accumulating dependence analysis information over multiple compilations, provision should be made for backing up the cache to non-volatile memory any time that the analysis procedure terminates. In FIG. 3, the cache data structure 30 is illustrated as comprising 3 records, 32, 34, 36. Although the number of records or cache entries is not critical, in practice it is more likely to comprise on the order of 50 or 100 records. This quantity of data is relatively small and therefore it can easily be maintained in RAM for fast access.

The cache data preferably includes the following elements or fields. The references field 40 includes the pair of array references, R1, R2, as described above. A bounds field 42 can be included in implementations where upper and lower loop bounds are specified. However, in most cases, upper and lower loop bounds can be omitted. In other words, the pair of references are analyzed for dependence in the general case. After those results are obtained, they can be further filtered in view of the particular loop bounds of interest to the compiler. The data dependence results for a given reference pair are stored in the result field 44. The results can include, for example, indications that the reference pair is dependent; independent; indeterminate (can't tell); and the like. Optionally, the result information can further include distance and/or direction vectors.

In addition to the array reference and result information just described, the cache further includes information useful for maintaining the cache. The cost field 46 provide an indication of the cost, for example in CPU time, to recompute the dependency in the corresponding record. Other things being equal, if a particular dependence is expensive to recompute, it should be retained in the cache as long as possible. Field 48 maintains a count of the number of accesses to that particular record. In other words, every time a process requests dependence information corresponding to a given record, the count field in that record is incremented. Other things being equal, a record that is accessed frequently should be maintained in the cache.

Finally, a "value" field 50 maintains an indication of the relative value of the corresponding record. The value is calculated as a function of the cost and count information. For example, the value might be determined as (j×costs)+ (k×count), where j and k are simply integer coefficients used for normalizing and weighting the costs and count data. The exact numbers can be tuned in light of experience over time to optimize performance. Alternatively, either the cost or count information alone could be used as an indication of the relative value of the corresponding record. When the cache is updated, the process simply overwrites the record having the least value.

Figure 4:
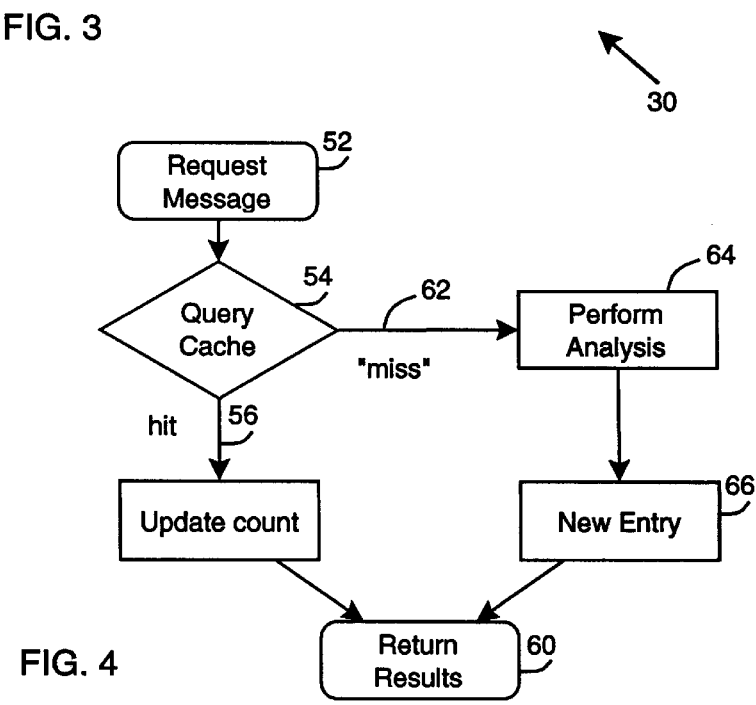
FIG. 4 is a simplified flow chart illustrating a method of utilizing a global data dependence cache of the type shown in FIG. 2.

FIG. 4 is a flow diagram illustrating operation of a system according to the present invention. In FIG. 4, a message 52 requesting dependence information generally corresponds to the message 26 in FIG. 2. Upon receiving such a message, the dependence process searches the cache described above, to determine whether the array reference pair, R1, R2, specified in the request message exist in the cache. This query is labeled 54 in the drawing. If the reference pair matches are record in the cache, it causes a cache "hit" 56. Accordingly, the process updated the count field (48 in FIG. 3) and proceeds in step 60 to return the results information (44 in FIG. 3) to the process that requested the information. If the subject reference pair is not found in the cache query 54, this causes a "miss" 62. In that case, the requested dependence analysis is performed in step 64 and then the corresponding reference pair and results are stored as a new entry in the cache, step 66. Finally, those results are returned to the requesting process, as indicated in step 60. Of course, the results of the analysis steps 64 can be returned immediately, to improve performance, and the cache subsequently updated as a background process. In the same vein, the analysis of the value field 50 in the cache can be conducted as a background process. It should also be noted that although the cache and related procedures have been described in terms suggestive of a conventional programming environment, the present invention could be implemented in an object-oriented environment. For example, each "record" as described in the cache could be implemented as an instance of a dependence class in which the array reference pair R1, R2, comprise instance variables. The methods for determining value would be common to the dependence objects, etc. An object-oriented implementation of the principles of the invention should be considered equivalent to implementation in a conventional procedural language.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A system-wide array dependence method comprising the steps of:

determining a dependence relationship of a first pair of array references so as to form a result;

generalizing the first pair of array references so as to define a type of array reference pair that includes the first pair; and storing said result of the determining step in a global cache file in association with the defined type of array reference pair so as to allow later retrieving the result in response to a query directed to the defined type of array reference pair.

2. A method according to claim 1 further comprising:

receiving a second pair of array references;

creating a static, single-assignment based symbolic expression for the second pair of references;

comparing the type of the second pair of references to the types of array reference pairs stored in the global cache file to determine a hit if the type of the second pair of references matches one of the types of array reference pairs stored in the global cache file or a miss if the type of the second pair of references does not match any of the types of array reference pairs stored in the global cache file;

and, if said comparing step results in a hit, returning the dependence information previously stored in the global cache file in association with the type of reference pairs that matches the type of the second reference pair.

3. A method according to claim 1 further comprising:

receiving a second pair of array references;

creating a static, single-assignment based symbolic expression for the second pair of references;

comparing the type of the second pair of references to the types of array reference pairs stored in the global cache file to determine a hit if the type of the second pair of references matches one of the types of array reference pairs stored in the global cache file or a miss if the type of the second pair of references does not match any of the types of array reference pairs stored in the global cache file;

and, if said comparing step results in a miss, determining a dependence relationship of the second pair of references so as to form a result; and returning the result.

4. A method according to claim 3 further comprising:

storing said result of the determining step in a global cache file in association with a type of the second pair of references.

5. A method according to claim 4 wherein said storing step includes first generalizing the second pair of array references so as to define a type of array reference pair that includes the second pair; and then storing said result of the determining step in the global cache file in association with the said defined type of the second pair of references.

6. A global array dependence cache stored in a computer-readable memory for storing array dependence information across compilations on a computer system to increase compiler efficiency and comprising the following data structure:

a plurality of cache records, each record including:

a first element storing a pair of array references;

a second element storing result information describing dependence of the pair of array references; and a third element storing an access count of a number of times the corresponding record has been accessed.

7. A global array dependence cache according to claim 6 and wherein each data record further includes a fourth element storing a computation cost of recomputing the dependence result information stored in the corresponding record.

8. A global array dependence cache according to claim 6 and wherein each data record further includes a fourth element storing a relative value of the record, the relative value being a predetermined function of computation cost and frequency of access of the corresponding record.

9. A global array dependence cache according to claim 6 and wherein each second element storing result information includes loop boundary information.

10. A computer system including a computer-readable memory storing the following software components in a form accessible to the computer system:

a compiler;

an array dependence analysis system available so that any instance of the compiler can send a request to the analysis process to obtain dependence information about a pair of array references specified in the request; and a system-wide array dependence cache for retaining data dependence information previously determined by the analysis system, so that data dependence information can be accumulated in the cache and shared among multiple instances of the compiler, wherein the system-wide array dependence cache comprises a plurality of cache records, each record including:

a first element storing a pair of array references;

a second element storing result information describing dependence of the pair of array references; and a third element storing an access count of a number of times the corresponding record has been accessed.

11. A computer system according to claim 10 wherein the data dependence information stored in the system-wide array dependence cache includes, for each one of a plurality of selected pairs of array references, both corresponding data dependence information and corresponding record utilization information.

12. A computer system according to claim 11 wherein the data dependence information stored in the cache includes distance vector information.

13. A computer system according to claim 11 wherein the data dependence information stored in the cache includes direction vector information.

14. A computer system according to claim 11 wherein the record utilization information includes an indication of a cost of recomputing the said dependence information.

15. A computer system according to claim 10 wherein the computer system includes a client-server architecture arranged so as to make the data dependence analysis system available to multiple users of the system and wherein the data dependence analysis process maintains the cache as a single, system-wide array dependence cache.

16. A method of using a system-wide data dependence cache comprising the steps of:

receiving a request for data dependence information from a compiler program, the request including a pair of array references in symbolic form;

querying a system-wide cache of predetermined array dependence information so as to determine whether a record comprising said pair of array references exists in the cache, wherein the cache comprises a plurality of cache records, each record including:
a first element storing a pair of array references;
a second element storing result information describing dependence of the pair of array references; and
a third element storing an access count of a number of times the corresponding record has been accessed;
if the querying step causes a hit, reading results stored in the cache in association with the said pair of array references and returning the results to the compiler; and
if the querying step causes a miss, performing a data dependence analysis on the said pair of array references, storing the results of the dependence analysis in the cache, and returning the results of the dependence analysis to the calling program.

17. A method according to claim 16 further comprising, if the querying step causes a miss, determining a cost of said performing a data dependence analysis on the said pair of references, and storing the cost in the cache in association with the said pair of references.

18. A method according to claim 16 further comprising, if the querying step causes a hit, incrementing an access count stored in the cache in association with the said pair of references.

19. A method according to claim 16 further comprising determining a relative value of each reference pair record in the cache, said determining step being based on a respective frequency of access of the reference pair.

20. A method according to claim 19 wherein said determining step is based on a respective frequency of access of the reference pair together with a respective cost of recomputing data dependence of the reference pair.

21. A method according to claim 16 further comprising, if the querying step exhibits a miss, updating the cache based on the relative value of each record in the cache.

* * * * *